(12) United States Patent
Guan et al.

(10) Patent No.: US 7,289,295 B2
(45) Date of Patent: Oct. 30, 2007

(54) RETURN POLE FIELD REDUCTION FOR PERPENDICULAR WRITE HEAD

(75) Inventors: Lijie Guan, Milpitas, CA (US); Hung Liang Hu, Los Altos Hills, CA (US); Yaw Shing Tang, Saratoga, CA (US); Kochan Ju, Monte Sereno, CA (US)

(73) Assignee: Headway Technologies, Inc., Milpitas, CA (US)

( * ) Notice: Subject to any disclaimer, the term of this patent is extended or adjusted under 35 U.S.C. 154(b) by 480 days.

(21) Appl. No.: 10/844,170

(22) Filed: May 12, 2004

(65) Prior Publication Data

US 2005/0254169 A1    Nov. 17, 2005

(51) Int. Cl.
*G11B 5/127* (2006.01)

(52) U.S. Cl. ..................................... 360/119
(58) Field of Classification Search ................. 360/119
See application file for complete search history.

(56) References Cited

U.S. PATENT DOCUMENTS

| | | | |
|---|---|---|---|
| 4,317,148 A | 2/1982 | Chi | 360/119 |
| 4,380,768 A | 4/1983 | Palombo et al. | 346/74.5 |
| 4,546,398 A | 10/1985 | Toda et al. | 360/126 |
| 5,214,378 A | 5/1993 | Hore | 324/207.23 |
| 6,501,619 B1 | 12/2002 | Sherrer et al. | 360/126 |
| 6,574,072 B1 | 6/2003 | Batra | 360/125 |
| 6,965,494 B2 * | 11/2005 | Campbell et al. | 360/126 |
| 7,233,457 B2 * | 6/2007 | Johnston et al. | 360/125 |
| 2002/0071208 A1 * | 6/2002 | Batra et al. | 360/125 |
| 2002/0141111 A1 | 10/2002 | Batra et al. | 360/125 |
| 2002/0176214 A1 * | 11/2002 | Shukh et al. | 360/317 |
| 2003/0043513 A1 | 3/2003 | Lin | 360/317 |
| 2003/0210494 A1 * | 11/2003 | Campbell et al. | 360/125 |
| 2004/0240108 A1 * | 12/2004 | Shukh | 360/125 |
| 2005/0128637 A1 * | 6/2005 | Johnston et al. | 360/125 |
| 2005/0243463 A1 * | 11/2005 | Fontana et al. | 360/126 |
| 2006/0082924 A1 * | 4/2006 | Etoh et al. | 360/125 |
| 2006/0119981 A1 * | 6/2006 | Li et al. | 360/125 |

OTHER PUBLICATIONS

"Writing performances of cusp-field single-pole head", by Kazuyuki Ise et al., Jrnl. of Magnetism and Magnetic Materials 235 (2001) 187-190.

* cited by examiner

*Primary Examiner*—Allen Cao
(74) *Attorney, Agent, or Firm*—Saile Ackerman LLC; Stephen B. Ackerman

(57) ABSTRACT

In a single vertical pole magnetic writer, flux passing through the return pole can sometimes be strong enough to erase previously recorded data. This problem has been overcome by the addition of a second return pole that is magnetically connected to the conventional return pole for the purpose of collecting leaked flux, thereby preventing it from reaching the underlayer.

26 Claims, 2 Drawing Sheets

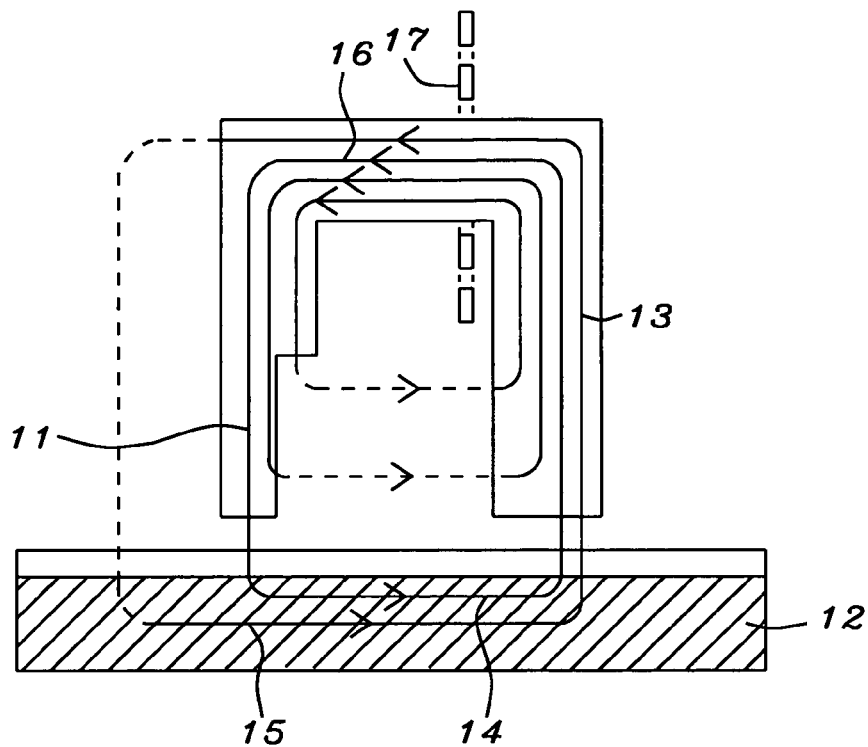
FIG. 1 – Prior Art
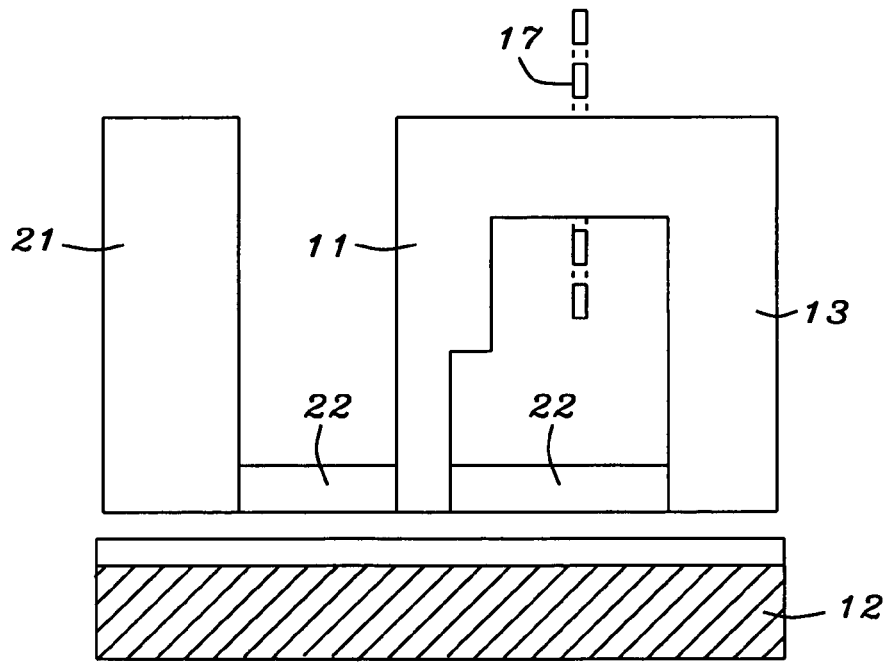
FIG. 2

RETURN POLE FIELD REDUCTION FOR PERPENDICULAR WRITE HEAD

FIELD OF THE INVENTION

The invention relates to the general field of perpendicular write heads with particular reference to removal of unwanted flux near the write head.

BACKGROUND OF THE INVENTION

A perpendicular recording system using media with a soft underlayer has the advantage of providing a larger write field than systems without such underlayer. With a soft underlayer, magnetic flux travels from the main writing pole 11 into underlayer 12 and back through return pole 13, as symbolized by solid lines 14 in FIG. 1. The flux that returns via the underlayer also passes through the recording layer, but at a lower density than the write field because of the greater width of the return pole relative to the write pole.

However, if the flux that passes through the return pole is strong enough, it can still erase previously recorded data since the return flux includes not only flux emitted from the tip of the main writing pole, but also flux leaked from yoke 16, shown as dotted line 15 in FIG. 1. The contribution to the density of return flux from this source can be significant because the size of the disk is far larger than the head so most of leaked flux would be collected and then concentrated at the return pole.

Also shown in FIG. 1 is write coil 17 that surrounds yoke 16.

In a prior application (No. 09/942,290) it was shown that when a pole head is driven differentially, the return pole field is greatly reduced. Here we disclose a design that uses the conventional single coil.

A routine search of the prior art was performed with the following references of interest being found:

U.S. 2002/0176214 (Shukh et al) and 2002/0141111 and 2002/0071208 (Batra et al) all show a main pole between two return poles. In U.S. Pat. No. 4,380,768, Palumbo et al. disclose a single protrusion forming a recording head and all the surrounding protrusions forming the return pole while Sherrer et al. describe a U-shaped return pole in U.S. Pat. No. 6,501,619.

Hore (in U.S. Pat. No. 5,214,378) shows a displacement sensor having two pairs of active poles and two return poles. In U.S. Pat. No. 4,317,148, Chi discloses a single recording pole and a flux return pole while Batra teaches a single return pole and a main pole in U.S. Pat. No. 6,574,072.

SUMMARY OF THE INVENTION

It has been an object of at least one embodiment of the present invention to provide a vertical magnetic write head.

Another object of at least one embodiment of the present invention has to minimize the density of any magnetic flux that passes through the write media from any source other than the vertical write head itself.

Still another object of at least one embodiment of the present invention has been to provide a method for realizing the preceding objects.

These objects have been achieved by the addition of a second return pole that is magnetically connected to the conventional return pole for the purpose of collecting leaked flux and preventing it from reaching the underlayer. This reduced leakage from about 0.1300 T (for the single return pole design) to about 0.03 T for the double return pole design of the present invention.

BRIEF DESCRIPTION OF THE DRAWINGS

FIG. 1 shows a conventional vertical magnetic writer, including a single return pole.

FIG. 2 is a cross-sectional view of the present invention which is a vertical magnetic writer having two return poles.

DESCRIPTION OF THE PREFERRED EMBODIMENTS

Figure 3:
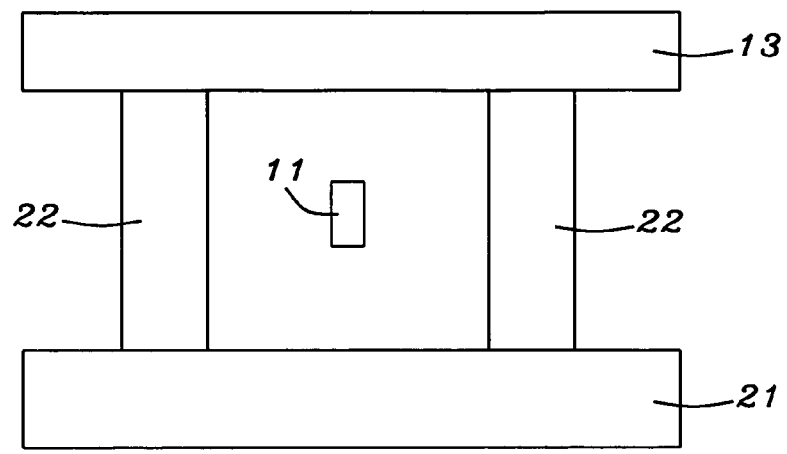
FIG. 3 is a plan (ABS) view of FIG. 2.

The present invention describes the addition of a second return pole that is magnetically connected to the conventional return pole for the purpose of collecting leaked flux and preventing it from reaching the underlayer. A cross-sectional view of the invention is shown in FIG. 2 while a plan showing the ABS (air bearing surface) view of the structure is shown in FIG. 3. As can be seen, second return pole 21 serves as a shield to prevent the leaked flux from reaching soft underlayer 12.

Connection between first and second return pole is made at their outer edges so that each connector 22 is at a distance of between about 0.5 and 10 microns from the main pole and is outside of coil 17. With the presence of second return pole 21, the leaked flux from the yoke has an easier return path via the second return pole than passing through the disk. Therefore, the flux density at each return pole can be significantly reduced. The remaining leakage flux passing through the disk can be further divided between the two return poles, leading to even smaller fields at each of the return poles. Note that the second return pole can be the part of an existing head structure, such as the reader shield, or the shield for stray field control.

Figure 4:
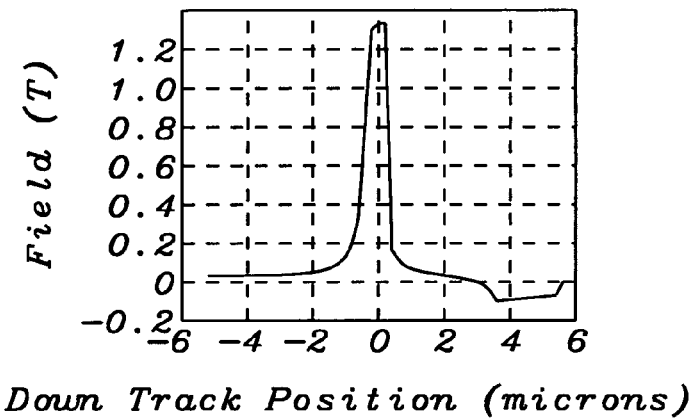
FIG. 4 is a plot of magnetic field at the media surface as function of distance from the write pole, for a conventional single return pole design.
Figure 5:
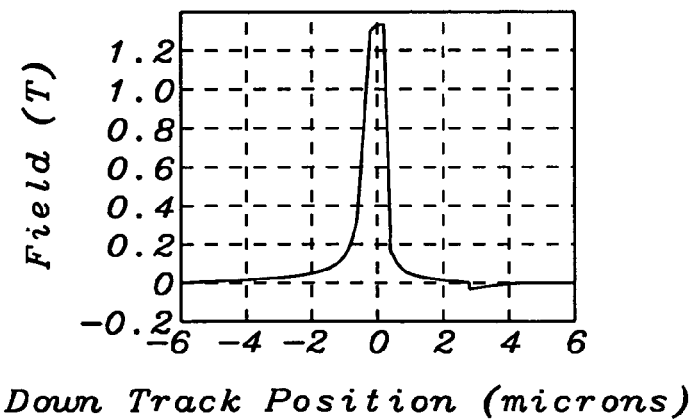
FIG. 5 is a plot of magnetic field at the media surface as function of distance from the write pole, for a dual return pole design.

FIGS. 4 and 5 show the magnetic field at the recording layer at different down track positions for a single (FIG. 4) and double (FIG. 5) return pole perpendicular writer. The ABS size of the main pole tip is about 0.2 by about 0.1 microns, the first return pole size is about 2 microns by about 16 microns, the second return pole size is also about 2 microns by about 16 microns. Both return poles are spaced about 3 microns away from main pole. The spacing between main pole and soft underlayer is 50 nm and the driving MMF (magneto-motive force) is about 120 mAT.

With the invented structure, the unwanted field at the return poles can be seen to have been reduced from about 0.1300 T for the single return pole (FIG. 4) to about 0.03 T (23%) for the double return pole (FIG. 5). As a comparison, another way to reduce the return pole field for a single return pole writer is simply to increase the width of the return pole. It can be computed that, for the case seen in FIG. 4, if the width of the single return pole is increased from 16 microns to 32 microns, the return pole field will be reduced to 0.065 T, a significantly lower reduction than was achieved in the double return pole case. This is because the second return pole can also effectively intercept part of the leakage flux from yoke.

What is claimed is:

1. A vertical magnetic write head, having an ABS, comprising:
   a main write pole magnetically connected to a first return pole through a yoke;
   a write coil surrounding said yoke;
   a second return pole located a distance from said main pole, said main pole being positioned between the two return poles;
   opposing magnetic connectors between said first and second return poles, each connector having a lower surface that is coplanar with that of said main pole and that of said first return pole;
   said write pole, viewed in a direction normal to said ABS, being located centrally and symmetrically within a rectangle formed by said two return poles and said opposing magnetic connectors; and
   said connectors having no magnetic contact with said main pole.

2. The magnetic write head described in claim 1 wherein said write pole has a width at its tip of between about 0.05 and 0.2 microns.

3. The magnetic write head described in claim 1 wherein said write pole has an area at its tip of between about 0.01 and 0.08 square microns.

4. The magnetic write head described in claim 1 wherein said second return pole has a width at its tip of between about 5 and 50 microns.

5. The magnetic write head described in claim 1 wherein said second return pole has an area at its tip of between about 10 and 100 square microns.

6. The magnetic write head described in claim 1 wherein said first return pole has a width at its tip of between about 5 and 50 microns.

7. The magnetic write head described in claim 1 wherein said first return pole has an area at its tip of between about 10 and 100 square microns.

8. The magnetic write head described in claim 1 wherein the distance between the second return pole and the main pole is between about 0.5 and 5 microns.

9. The magnetic write head described in claim 1 wherein said opposing magnetic connectors are between about 0.5 and 10 microns from said main pole.

10. The magnetic write head described in claim 1 wherein said magnetic connectors are between about 1 and 5 microns thick.

11. The magnetic write head described in claim 1 wherein said magnetic connectors are selected from the group consisting of Ni, Fe, Go, and their alloys.

12. The magnetic write head described in claim 1 wherein said second return pole is selected from the group consisting of Ni, Fe, Go, and their alloys.

13. The magnetic write head described in claim 1 wherein said second return pole also serves as a shield for a read head integrated with said write head.

14. A method to remove unwanted flux from a return pole, comprising:
   providing a main write pole, having an ABS, that is magnetically connected to a first return pole through a yoke, and having a write coil surrounding said yoke;
   placing a second return pole at a first distance from said main pole whereby said main pole is located between said two return poles; and
   magnetically connecting said first and second return poles by means of opposing connectors, each having a lower surface that is coplanar with that of said main pole and with that of said first return pole, each of said connectors being located a second distance from said main pole whereby said write pole, viewed in a direction normal to said ABS, is located centrally and symmetrically within a rectangle formed by said two return poles and said opposing magnetic connectors.

15. The method recited in claim 14 wherein said write pole has a width at its tip of between about 0.05 and 0.2 microns.

16. The method recited in claim 14 wherein said write pole has an area at its tip of between about 0.01 and 0.08 square microns.

17. The method recited in claim 14 wherein said second return pole has a width of between about 5 and 50 microns.

18. The method recited in claim 14 wherein said second return pole has an area of between about 10 and 100 square microns.

19. The method recited in claim 14 wherein said first return pole has a width of between about 5 and 50 microns.

20. The method recited in claim 14 wherein said first return pole has an area of between about 10 and 100 square microns.

21. The method recited in claim 14 wherein first distance, between the second return pole and the main pole, is between about 0.5 and 5 microns.

22. The method recited in claim 14 wherein said second distance, between each magnetic connector and the main pole, is between about 0.5 and 10 microns.

23. The method recited in claim 14 wherein said magnetic connectors are between about 1 and 5 microns thick.

24. The method recited in claim 14 wherein said magnetic connectors are selected from the group consisting of Ni, Fe, Co, and their alloys.

25. The method recited in claim 14 wherein said second return pole is selected from the group consisting of Ni, Fe, Co, and their alloys.

26. The method recited in claim 14 wherein said second return pole also serves as a shield for an adjacent read head.

* * * * *